US012170558B2

(12) United States Patent
Penna et al.

(10) Patent No.: US 12,170,558 B2
(45) Date of Patent: Dec. 17, 2024

(54) OBTAINING LOCATION INFORMATION

(71) Applicant: NOKIA TECHNOLOGIES OY, Espoo (FI)

(72) Inventors: Federico Penna, San Diego, CA (US); Daejung Yoon, Massy (FR)

(73) Assignee: NOKIA TECHNOLOGIES OY, Espoo (FI)

(*) Notice: Subject to any disclaimer, the term of this patent is extended or adjusted under 35 U.S.C. 154(b) by 321 days.

(21) Appl. No.: 17/754,039

(22) PCT Filed: Oct. 4, 2019

(86) PCT No.: PCT/EP2019/076867
§ 371 (c)(1),
(2) Date: Mar. 22, 2022

(87) PCT Pub. No.: WO2021/063516
PCT Pub. Date: Apr. 8, 2021

(65) Prior Publication Data
US 2022/0360304 A1 Nov. 10, 2022

(51) Int. Cl.
*H04B 7/06* (2006.01)
*G01S 5/00* (2006.01)
*H04W 64/00* (2009.01)

(52) U.S. Cl.
CPC .......... *H04B 7/0617* (2013.01); *G01S 5/0036* (2013.01); *H04B 7/0619* (2013.01); *H04B 7/0695* (2013.01); *H04W 64/00* (2013.01)

(58) Field of Classification Search
CPC .. H04B 7/0617; H04B 7/0619; H04B 7/0695; H04B 7/0408; H04B 7/063;
(Continued)

(56) References Cited

U.S. PATENT DOCUMENTS 6,768,459 B2   7/2004  Marinier
9,110,147 B1*  8/2015  Mason ............... G01S 5/0249
(Continued)

OTHER PUBLICATIONS

International Search Report and Written Opinion for International Application No. PCT/EP2019/076867; mailed on Jun. 2, 2020, 18 pages.
(Continued)

Primary Examiner — Kenneth T Lam
(74) Attorney, Agent, or Firm — Robert P. Michal, Esq.; Carter, DeLuca & Farrell LLP

(57) ABSTRACT

A system comprising a first apparatus, a second apparatus and a third apparatus, wherein the first apparatus is configured to provide, to a second apparatus, information regarding a number of antennas and/or an oversampling factor; the second apparatus is configured to transmit a plurality of beams in accordance with the information received from the first apparatus regarding the number of antennas and the oversampling factor; the third apparatus configured to receive a plurality of beamformed reference signals transmitted by the second apparatus, obtain measurement results for at least two of the plurality of beamformed reference signals, wherein the measurement results comprise one or more of: reference signal received power value, beam identifier, a value indicating uncertainty of the accuracy of the reference signal received power value; and transmit the measurement results to the second apparatus; and wherein the second apparatus is further configured to: process the received measurement results to obtain information regarding a position of the third apparatus and to transmit the obtained information regarding the position of the third apparatus to the first apparatus; and wherein the first apparatus is further configured to receive further measurement results from at least one further apparatus in addition to the second apparatus and to determine the location of the third
(Continued)

apparatus based on the received measurement results and the received further measurement results.

1 Claim, 10 Drawing Sheets

(58) Field of Classification Search
CPC .......... G01S 5/0036; G01S 1/04; G01S 1/042; G01S 5/0205; H04W 64/00
See application file for complete search history.

(56) References Cited

U.S. PATENT DOCUMENTS

| | | | |
|---|---|---|---|
| 9,755,797 | B2 | 9/2017 | Wu et al. |
| 10,021,667 | B2 | 7/2018 | Akkarakaran et al. |
| 10,236,946 | B2 | 3/2019 | Park et al. |
| 2014/0159945 | A1 | 6/2014 | Chung et al. |
| 2017/0212204 | A1 | 7/2017 | Amizur et al. |
| 2018/0317042 | A1 | 11/2018 | Kasher et al. |
| 2018/0324738 | A1* | 11/2018 | Stirling-Gallacher ...................... G01S 5/0205 |
| 2019/0037529 | A1 | 1/2019 | Edge et al. |
| 2019/0044589 | A1* | 2/2019 | Park ...................... H04B 7/0408 |
| 2019/0173554 | A1* | 6/2019 | Kwak .................. H04B 7/0626 |
| 2019/0190806 | A1 | 6/2019 | Bhushan et al. |
| 2020/0259896 | A1* | 8/2020 | Sachs .................. H04W 12/04 |
| 2023/0037317 | A1* | 2/2023 | Kwak .................. H04J 11/0073 |

OTHER PUBLICATIONS

3GPP TSG-RAN3 Meeting #104, R3-192728; "Discussion on DL Positioning Procedure"; Agenda Item: 19.2; Source: Huawei; Reno, Nevada, US; May 13-17, 2019; 4 pages.
3GPP TSG-RAN WG1 #96, R1-1901847; "DL Based NR Positioning"; Agenda Item: 7.2.10.1.1; Source: Nokia, Nokia Shanghai Bell; Athens, Greece; Feb. 25-Mar. 1, 2019; 6 pages.
Rosado et al., "Survey of Cellular Mobile Radio Localization Methods: From 1G to 5G", IEEE Communications Surveys & Tutorials, vol. 20, No. 2, Apr.-Jun., 2018, pp. 1124-1148.
"Wireless E911 Location Accuracy Requirements", Federal Communications Commission, FCC-15-9, Feb. 3, 2015, pp. 1-116.
"3rd Generation Partnership Project; Technical Specification Group Radio Access Network; Study on indoor positioning enhancements for UTRA and LTE (Release 13)", 3GPP TR 37.857, V13.1.0, Dec., 2015, pp. 1-83.
"3rd Generation Partnership Project; Technical Specification Group Radio Access Network; Study on NR positioning support (Release 16)", 3GPP TR 38.855, V2.1.0, Mar., 2019, pp. 1-197.
"New WID: NR Positioning Support", 3GPP TSG RAN Meeting #83, RP-190752, Agenda Item: 9.1.1, Intel Corporation, Mar. 18-21, 2019, 6 pages.
Liu et al., "Prospective Positioning Architecture and Technologies in 5G Networks", IEEE Network, vol. 31, No. 6, Dec. 2017, pp. 115-121.
Wymeersch et al., "5G mmWave Positioning for Vehicular Networks", IEEE Wireless Communications, vol. 24, No. 6, Dec. 2017, pp. 80-86.
"Physical layer procedure for NR positioning", 3GPP TSG RAN WG1 Meeting #96b, R1-1904006, Agenda Item: 7.2.10.3, Huawei, Apr. 8-12, 2019, 11 pages.
"Downlink Positioning Solutions: design and evaluations", 3GPP TSG RAN WG1 Ad-Hoc Meeting 1901, R1-1901195, Agenda Item: 7.2.10.1.1, Ericsson, Jan. 21-25, 2019, pp. 1-22.
"Potential Positioning Techniques—DL based solutions", 3GPP TSG RAN WG1 Meeting #AH-1901, R1-1901022, Agenda item: 7.2.10.1.1, Nokia, Jan. 21-25, 2019, 5 pages.
"RAT dependent NR positioning solutions", 3GPP TSG-RAN WG1 #95, R1-1813592, Agenda Item: 7.2.10.3, Ericsson, Nov. 12-16, 2018, pp. 1-17.
"NR beam management supporting multi-gNB measurements for positioning", 3GPP TSG RAN WG1 Meeting #95, R1-1813583, Agenda Item: 7.2.10.3, Fraunhofer IIS, Nov. 12-16, 2018, 8 pages.
Rastorgueva-Foi et al., "User Positioning in mmW 5G Networks using Beam-RSRP Measurements and Kalman Filtering", arXiv, Mar. 26, 2018, 7 pages.
Ayach et al., "Spatially Sparse Precoding in Millimeter Wave MIMO Systems", IEEE Transactions on Wireless Communications, vol. 13, No. 3, Mar. 2014, pp. 1499-1513.
Yang et al., "DFT-based Beamforming Weight-Vector Codebook Design for Spatially Correlated Channels in the Unitary Precoding Aided Multiuser Downlink", IEEE International Conference on Communications, May 23-27, 2010, 5 pages.
IEEE 802.11ad, Wikipedia, Retrieved on Aug. 6, 2024, Webpage available at : https://en.wikipedia.org/wiki/IEEE_802.11ad, 2 pages.
IEEE 802.11, Wikipedia, Retrieved on Aug. 6, 2024, Webpage available at : https://en.wikipedia.org/wiki/IEEE_802.11, 18 pages.
"Downlink based solutions for NR positioning", 3GPP TSG RAN WG1 Ad-Hoc Meeting 1901, R1-1900036, Agenda Item: 7.2.10.1.1, Huawei, Jan. 21-25, 2019, 7 pages.
Xie et al., "Position-aided Fast Millimetre-wave Beam Training with Compressive Sensing", Electronics Letters, vol. 54, No. 19, Sep. 20, 2018, 2 pages.
IEEE 802.15, Wikipedia, Retrieved on Aug. 6, 2024, Webpage available at : https://en.wikipedia.org/wiki/IEEE_IEEE 802.15, 6 pages.
Office Action received for corresponding European Patent Application No. 19801479.7, dated Jul. 4, 2024, 11 pages.

* cited by examiner

OBTAINING LOCATION INFORMATION

CROSS-REFERENCE TO RELATED APPLICATIONS

This application is a national stage entry of International Application No. PCT/EP2019/076867, filed Oct. 4, 2019, entitled "OBTAINING LOCATION INFORMATION" which is hereby incorporated by reference in its entirety.

FIELD

The following embodiments relate to cellular communication systems and obtaining information regarding a location of an apparatus.

BACKGROUND

Various methods may be utilized to obtain information regarding a device. For example, global navigation satellite system may be utilized by having an apparatus dedicated for the satellite-based positioning. In a cellular communication system that is capable of transmitting data and/or voice location positioning data may also be determined based on transmitted signals. There may also be regulations that require a cellular communication network to be able to position a device connected to the cellular communication network.

BRIEF DESCRIPTION OF THE INVENTION

According to an aspect, there is provided a method comprising: receiving, from a location management function, information regarding a number of antennas and/or an oversampling factor; transmitting, by an access node, a plurality of beams in accordance with the information received regarding the number of antennas and the oversampling factor; receiving measurement results regarding the plurality of beams from another apparatus; and processing the received measurement results to obtain information regarding a position of the other apparatus.

According to an aspect, there is provided a method comprising: receiving a plurality of beamformed reference signals transmitted by an access node; obtaining measurement results for at least two of the plurality of beamformed reference signals, wherein the measurement results comprises one or more of: reference signal received power value, beam identifier, a value indicating uncertainty of the accuracy of the reference signal received power value; and transmitting the measurement results to the access node.

According to an aspect, there is provided a method comprising: providing, to a plurality of apparatuses, information regarding a number of antennas and/or an oversampling factor; receiving, from the plurality of apparatuses, measurement results of a plurality of beams transmitted by the plurality of apparatuses according to the information provided; determining, based on the received measurement results, a location of an apparatus that is connected to the plurality of apparatuses.

According to another aspect, there is provided an apparatus, comprising: at least one processor, and at least one memory including a computer program code, wherein the at least one memory and the computer program code are configured, with the at least one processor, to cause the apparatus to: receive, from a location management function, information regarding a number of antennas and/or an oversampling factor; transmit, by the access node, a plurality of beams in accordance with the information received regarding the number of antennas and the oversampling factor; receive measurement results regarding the plurality of beams from another apparatus; and process the received measurement results to obtain information regarding a position of the other apparatus.

According to another aspect, there is provided an apparatus, comprising: at least one processor, and at least one memory including a computer program code, wherein the at least one memory and the computer program code are configured, with the at least one processor, to cause the apparatus to: receive a plurality of beamformed reference signals transmitted by an access node; obtain measurement results for at least two of the plurality of beamformed reference signals, wherein the measurement results comprises one or more of: reference signal received power value, beam identifier, a value indicating uncertainty of the accuracy of the reference signal received power value; and transmit the measurement results to the access node.

According to another aspect, there is provided an apparatus, comprising: at least one processor, and at least one memory including a computer program code, wherein the at least one memory and the computer program code are configured, with the at least one processor, to cause the apparatus to: provide, to a plurality of apparatuses, information regarding a number of antennas and/or an oversampling factor; receive, from the plurality of apparatuses, measurement results of a plurality of beams transmitted by the plurality of apparatuses according to the information provided; determine, based on the received measurement results, a location of an apparatus that is connected to the plurality of apparatuses.

According to another aspect there is provided an apparatus comprising means for receiving, from a location management function, information regarding a number of antennas and/or an oversampling factor; transmitting, by an access node, a plurality of beams in accordance with the information received regarding the number of antennas and the oversampling factor; receiving measurement results regarding the plurality of beams from another apparatus; and processing the received measurement results to obtain information regarding a position of the other apparatus.

According to another aspect there is provided an apparatus comprising means for receiving a plurality of beamformed reference signals transmitted by an access node; obtaining measurement results for at least two of the plurality of beamformed reference signals, wherein the measurement results comprises one or more of: reference signal received power value, beam identifier, a value indicating uncertainty of the accuracy of the reference signal received power value; and transmitting the measurement results to the access node.

According to another aspect there is provided an apparatus comprising means for providing, to a plurality of apparatuses, information regarding a number of antennas and/or an oversampling factor; receiving, from the plurality of apparatuses, measurement results of a plurality of beams transmitted by the plurality of apparatuses according to the information provided; determining, based on the received measurement results, a location of an apparatus that is connected to the plurality of apparatuses.

According to another aspect there is provided a computer program product readable by a computer and, when executed by the computer, configured to cause the computer to execute a computer process comprising: receiving, from a location management function, information regarding a number of antennas and/or an oversampling factor; transmitting, by an access node, a plurality of beams in accordance with the information received regarding the number of antennas and the oversampling factor; receiving measurement results regarding the plurality of beams from another apparatus; and processing the received measurement results to obtain information regarding a position of the other apparatus.

According to another aspect there is provided a computer program product readable by a computer and, when executed by the computer, configured to cause the computer to execute a computer process comprising: receiving a plurality of beamformed reference signals transmitted by an access node; obtaining measurement results for at least two of the plurality of beamformed reference signals, wherein the measurement results comprises one or more of: reference signal received power value, beam identifier, a value indicating uncertainty of the accuracy of the reference signal received power value; and transmitting the measurement results to the access node.

According to another aspect there is provided a computer program product readable by a computer and, when executed by the computer, configured to cause the computer to execute a computer process comprising: providing, to a plurality of apparatuses, information regarding a number of antennas and/or an oversampling factor; receiving, from the plurality of apparatuses, measurement results of a plurality of beams transmitted by the plurality of apparatuses according to the information provided; determining, based on the received measurement results, a location of an apparatus that is connected to the plurality of apparatuses.

According to another aspect there is provided a computer program product comprising computer-readable medium bearing computer program code embodied therein for use with a computer, the computer program code comprising code for executing receiving, from a location management function, information regarding a number of antennas and/or an oversampling factor; transmitting, by an access node, a plurality of beams in accordance with the information received regarding the number of antennas and the oversampling factor; receiving measurement results regarding the plurality of beams from another apparatus; and processing the received measurement results to obtain information regarding a position of the other apparatus.

According to another aspect there is provided a computer program product comprising computer-readable medium bearing computer program code embodied therein for use with a computer, the computer program code comprising code for executing receiving a plurality of beamformed reference signals transmitted by an access node; obtaining measurement results for at least two of the plurality of beamformed reference signals, wherein the measurement results comprises one or more of: reference signal received power value, beam identifier, a value indicating uncertainty of the accuracy of the reference signal received power value; and transmitting the measurement results to the access node.

According to another aspect there is provided a computer program product comprising computer-readable medium bearing computer program code embodied therein for use with a computer, the computer program code comprising code for executing providing, to a plurality of apparatuses, information regarding a number of antennas and/or an oversampling factor; receiving, from the plurality of apparatuses, measurement results of a plurality of beams transmitted by the plurality of apparatuses according to the information provided; determining, based on the received measurement results, a location of an apparatus that is connected to the plurality of apparatuses.

LIST OF DRAWINGS

In the following, the invention will be described in greater detail with reference to the embodiments and the accompanying drawings, in which FIG. 1 illustrates an exemplary embodiment of a cellular communication network.

DESCRIPTION OF EMBODIMENTS

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

Figure 1:
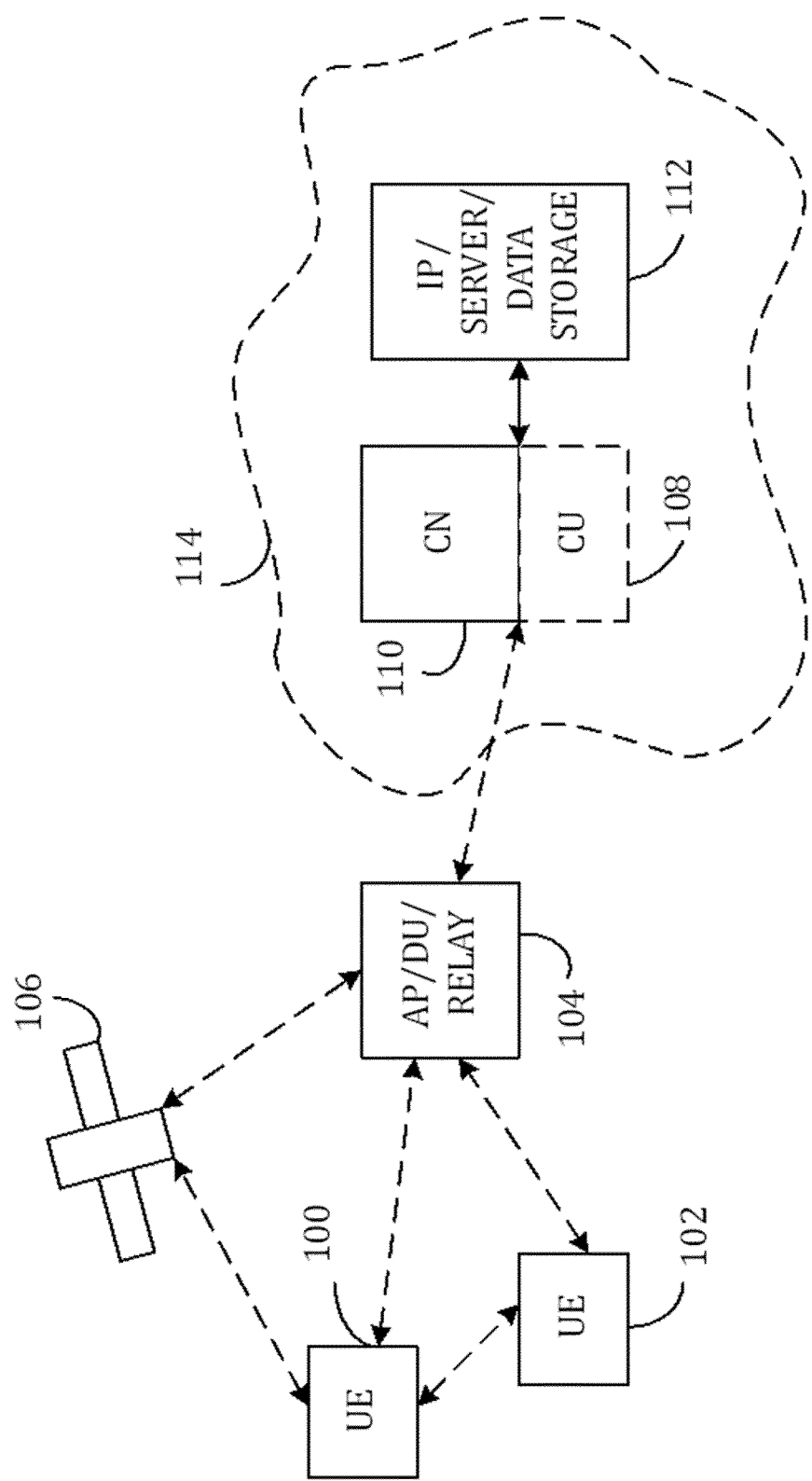

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. It is to be noted that in some example embodiments a split gNodeB architecture, as defined in 3GPP, may be followed. In such an example embodiment a central unit, CU, associated with a gNodeB is located separate from an element such as 104 illustrated in FIG. 1 and may be located as part of an element 114 as the CU 108.

The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage.

A communication system, such as a cellular communication system, typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point, an access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi- directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of terminal devices (UEs) to external packet data networks, or mobile management entity (MME), etc. It is to be noted that the NGC may comprise functionalities such as access and mobility management, AMF, session management function, SMF and/or user plane function, UPF.

The terminal device (also called as UE, user equipment, user terminal, user device, etc.) illustrates one type of an apparatus to which resources on the air interface are allocated and assigned to, and thus any feature described herein with a terminal device may be implemented with a corresponding apparatus, such as a relay node. An example of such a relay node is a layer 2 relay (self-backhauling relay) towards the base station. Such a relay node may contain a mobile termination (MT) part and a Distributed Unit (DU) part. A CU (centralized unit) may coordinate the DU operation via HAP -interface for example.

The terminal device may, in some examples, refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. Yet, a vehicle may also be considered as a terminal device for example if it is configured to connect to a wireless network such as a cellular communication network. It should be appreciated that a user device may also be a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction.

The terminal device may also utilise cloud. In some applications, a terminal device may comprise a small portable device with radio parts (such as a watch, earphones or eyeglasses) and the computation is carried out in the cloud. The terminal device (or in some embodiments an MT part of integrated access and backhaul (IAB) node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is to be noted that the depicted system is only an example of a part of a radio access system and in practice, the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

For the purpose of achieving high-speed broadband communication, frequencies with short wavelength may be utilized. Examples of such frequencies include millimetre wave and also other frequency bands, such as unlicensed band at 5 GHz. Millimetre waves, mmWaves, have short wavelengths that range from 10 millimeters to 1 millimeter and the spectrum is the frequency band between 30 GHz and 300 GHz. It may also be possible to use technologies defined for mmWave also below 30 GHz. For example, 28 GHz could be used. Some sub-bands of the mmWave frequency band may require a license from the regulators while other sub-bands may be unlicensed and thereby available without a license. Yet the short wavelength of mmWave causes high attenuation and the waves may be absorbed by gases in the atmosphere as well as attenuated by buildings and other obstacles in the environment.

Because of the high attenuation, the cell coverage achieved by one access node operating in the mmWave bandwidth is relatively small when comparing to the cell coverage of a 4G access node operating on a lower frequency band for example. Due to the relatively small cell coverage achieved by an access node, there may be a need for having more access nodes to cover a geographical area. It may be that not all such access nodes are equipped with a wired backhaul connection. If an access node does not have a wired backhaul connection, the access node may utilize the wireless channel resources to connect to an access node that does have a wired backhaul connection or the access node may connect to another access node and the other access node is then connected to an access node with a wired backhaul connection. The access node may therefore be called as an integrated access and backhaul, IAB, node. The access node that does have the wired backhaul connection and to which the IAB node connects to for backhauling, may be called as a donor node. In the case of self-backhaul (a.k.a. integrated access and backhaul) the donor node uses the same wireless channel to serve terminal devices that are within a cell provided by the donor access node and to provide a wireless backhaul connection for the IAB node. Out-of-band relaying corresponds to a scenario without access terminal devices in a spectrum where the out-of-band relaying takes place. In some examples, a donor node may also have out-of-band relayed backhaul connection instead of a wired backhaul connection.

By having donor nodes and IAB nodes, the coverage of a communication system may be extended without having to equip all access nodes with a wired backhaul connection. This may be useful for example if the communication system operates using an unlicensed frequency band, like at or around 60 GHz. As the donor node (and/or CU) is configured to have an overall control of the radio resources, coverage extension may be achieved with minimal manual efforts and self-configuration of the communication system may be enabled.

Positioning of a terminal device in a cellular communication network such as 5G may be achieved using various techniques. For example, a time difference of arrival, TDOA, technique may be used. In TDOA, three or more receivers are used to locate a signal source. TDOA technique may be used both in downlink and in uplink. Other examples of a positioning techniques applicable to cellular communication network such as 5G comprise angle-based techniques such as angle of arrival, AoA, applicable to uplink and angle of departure, AoD, applicable to downlink. AoA and AoD may be understood as angles-of-signals in some exemplary embodiments. Further examples of determining a position of a terminal device comprise also round-trip time, RTT, and enhanced cell-ID, E-CID techniques.

Figure 2:
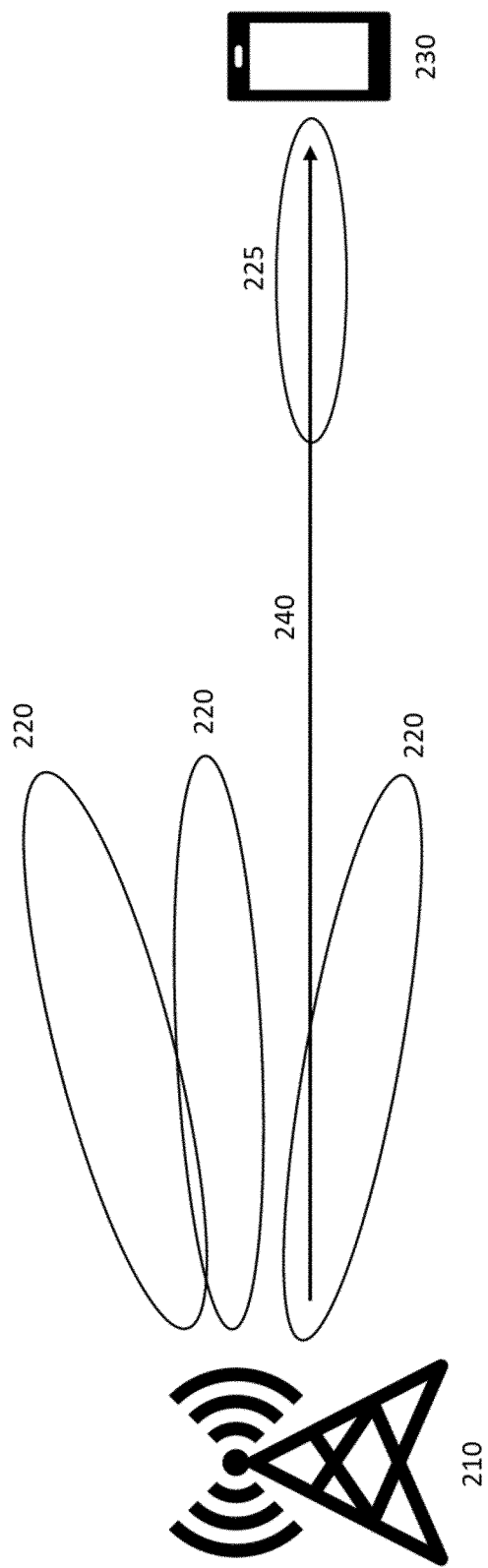
FIG. 2 illustrates an exemplary embodiment of an angular-based positioning technique.

FIG. 2 illustrates an exemplary embodiment of an angle-based positioning technique that may be used in a cellular communication network such as 5G. The exemplary embodiment of FIG. 2 illustrates a technique that utilizes beamformed reference signals. An access node 210, which in this exemplary embodiment is a gNodeB, transmits a plurality of positioning reference signals, PRS, 220 towards various directions. The transmitting may be done using analog and/or digital beamforming. The transmitting of the plurality of PRS 220 may be done sequentially. It is to be noted that although the access node 210 in this exemplary embodiment is a gNodeB, in some alternative embodiments other types of access nodes capable of transmitting a plurality of beamformed reference signals could be used.

A terminal device 230 then measures, for at least some of the transmitted plurality of PRS 220, a reference signal received power, RSRP. Based on the measurements, the terminal device 230 determines which beam direction has the highest RSRP value. The terminal device 230 then determines the AoD as the direction of that 225. Determining the AoD may in some exemplary embodiments comprise estimating the AoD. Information regarding the determined AoD is then transmitted by the terminal device 230 to the access node 210. The information regarding the determined AoD may, additionally, or alternatively, comprise a beam index corresponding to the determined AoD and may be transmitted by the terminal device 230 to the access node 210. The access node 210 may then report the information to a central positioning entity. The central positioning entity, which may be a location management function LMF, for example, is comprised in the cellular communication network. The central positioning entity may then further process the information. For example, the central positioning entity may calculate, based on measurement results obtained by a terminal device, an angle-of-signal.

In the exemplary embodiment of FIG. 2, there is a line of sight, LOS, 240 between the access node 210 and the terminal device 230. Therefore, the maximum RSRP may be obtained by the PRS beam that is most closely aligned with the LOS direction.

Yet, it is possible that in the exemplary embodiment of FIG. 2, the achievable angular resolution is limited by the number of the plurality of beams transmitted by the access node 210. For example, if 64 beams are transmitted for a synchronization signal block, SSB, for a frequency range of 24.25 GHz-52.6 GHz, which may be called as frequency range 2, FR2, within 5G, the theoretical resolution is then 360/64 which equals to 5.6 degrees. Further, RSRP measurement noise and beamforming imperfections may negatively affect the results.

It is also possible that in the exemplary embodiment of FIG. 2, uniform linear arrays, ULAs, beams do not have uniform directivity. Beams may, in some exemplary embodiments, be more directive in a broadside direction of the array, which may be understood as 90 degrees with respect to the array direction, and less towards an end-fire direction. Further, beams may not be equally spaced, in some exemplary embodiments, when they are generated using discrete fourier transform, DFT, -based codebooks as a beam corresponds to a linear DFT index l, e.g., $$e^{j2\pi k \frac{l}{O_t N_t}},$$

where $N_t$ is the number of transmit antennas, $O_t$ is an oversampling factor, and k is the antenna index. Yet, equally spaced beams in the angle domain may be generated as $$e^{j2\pi \frac{d}{\lambda} k \cos\theta},$$

where $\theta$ is the angle, d is the antenna array spacing, and $\lambda$ is the signal wavelength. Therefore, DFT-generated beams correspond to angles $$\theta_l = a\cos\left(\frac{\lambda}{d} \frac{l}{O_t N_t}\right).$$

Figure 3:
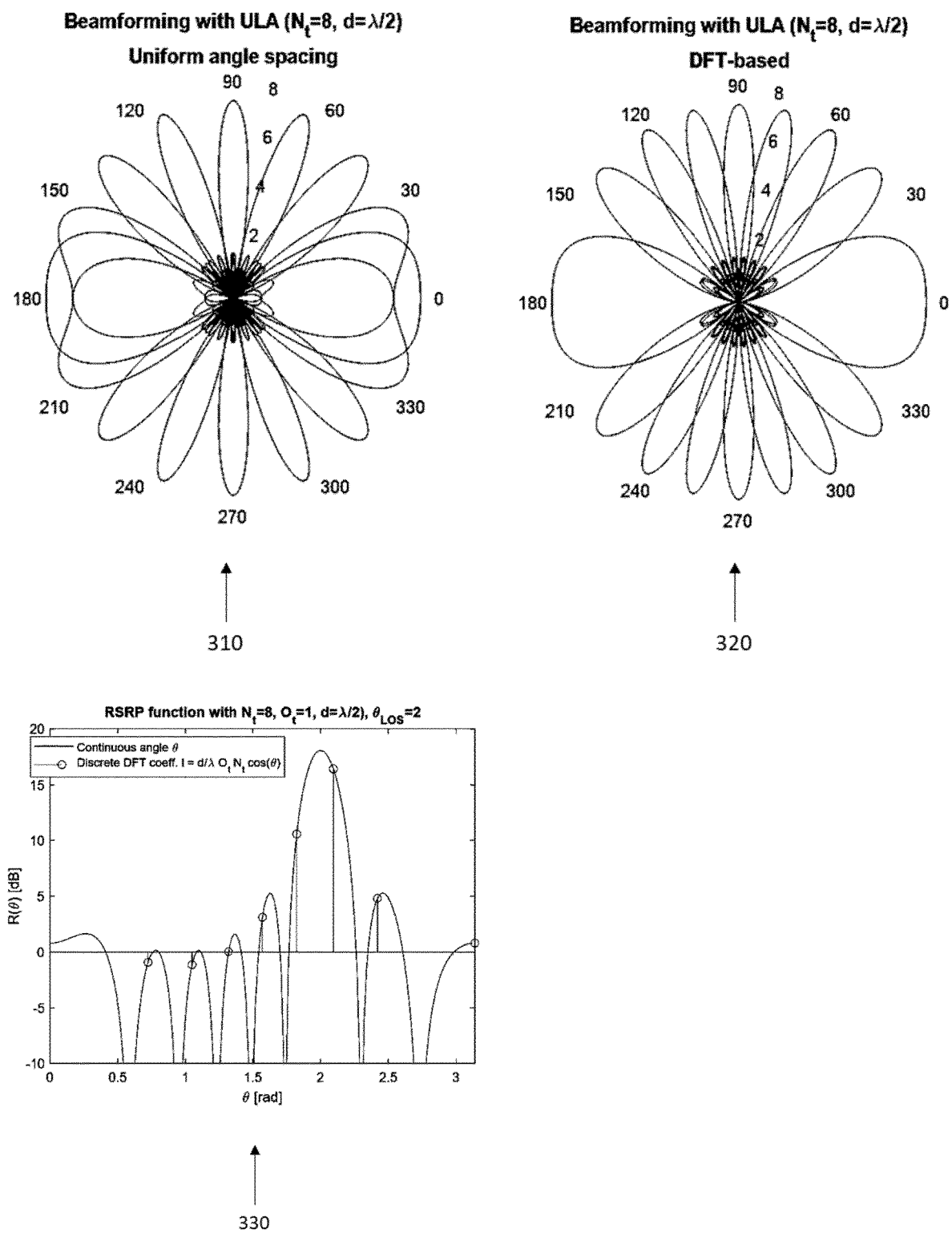
FIG. 3 illustrates measurement results of an exemplary embodiment.

Because of this non-linear relation between l and $\theta_l$, uniformly spaced DFT coefficients l result in non-uniformly spaced angles $\theta_l$. In FIG. 3, graph 310 illustrates a radiation pattern of an example embodiment in which a uniform angle space beamforming is utilized. The graph illustrates how the angular resolution is limited as described above and as beams do not have uniform directivity as also discussed above. Graph 320 of FIG. 3 illustrates how beams may not be equally spaced when generated by DFT-based codebooks as also discussed above. Graph 330 of FIG. 3 on the other hand compares the RSRP measured by a terminal device as a function of an angle $\theta$. In this exemplary embodiment, an ideal resolution is assumed against discrete RSRP values measured with an 8-beam DFT codebook. The channel is in this exemplary embodiment a LOS with single path, with an AoD of $\theta_{LOS}$=2 radians. No noise is assumed in RSRP measurement in this exemplary embodiment. The graph 330 illustrates that, even in if noise is absent, the estimated AoD relying on the maximum RSRP may not accurately correspond to an actual value. Thus, it may be beneficial to determine the AoD more accurately. In other words, a better estimation of the AoD may be beneficial. Estimation of an AoD may be understood as estimating the direction and/or spatial orientation of a transmitted beamformed signal. In some examples, the estimation may be performed by measuring relative signal strength of multiple received beams.

To achieve better accuracy and thereby more accurate location information of an apparatus such as a terminal device, the following procedure may be applied to obtain information that may then be processed such that the location may be determined. The procedure may also be called as protocol.

Figure 4:
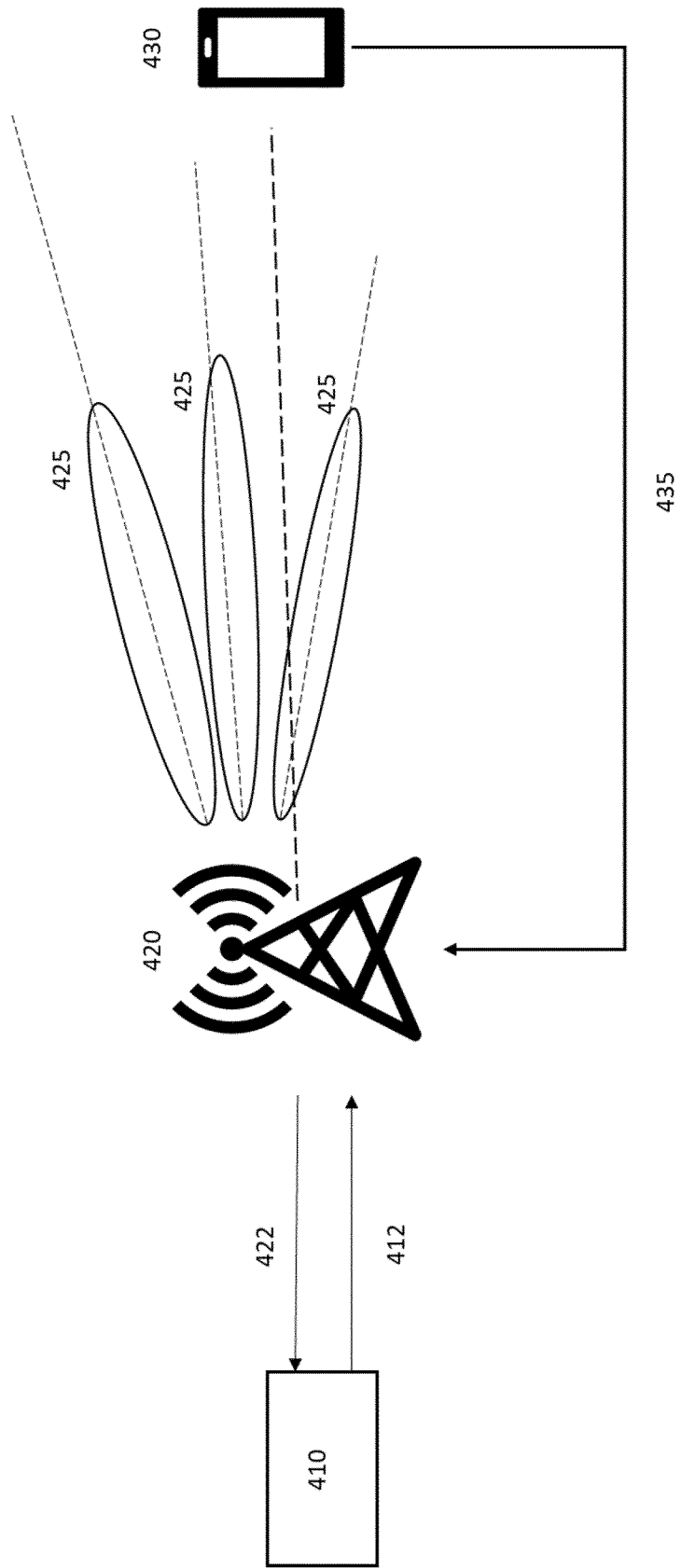
FIG. 4 illustrates an exemplary embodiment of positioning.

In an exemplary embodiment illustrated in FIG. 4, the procedure is utilized in a 5G cellular communication network in which an acces node 420, which in this exemplary embodiment is a gNodeB, transmits a plurality of PRSs 425. A terminal device 430 then performs RSRP measurements to the transmitted PRSs 425.

The procedure is next discussed in more detail. A central positioning entity 410 of the 5G network, which in this exemplary embodiment is a location management function, LMF, as introduced by 3GPP specifications, indicates 412 the access node 420 the number of antennas $N_t$ and an oversampling factor $O_t$ that are to be used when generating beams for positioning. It is to be noted that in some exemplary embodiments the location management function, or at least part of its functionality, is comprised in the access node 420. The terminal device 430 then measures a plurality of beamformed reference signals transmitted by the access node 420. The number of beams of the plurality of beams transmitted by the access node 420 that are to be measured by the terminal device 430 may be determined by the LMF 410, by the access node 420, and/or by the terminal device 430 itself. In this exemplary embodiment, the terminal device 430 measures the plurality of beams transmitted by the access node 420. For each beam measured the terminal device 430 determines measurement results. The measurement results may comprise a measured RSRP value $r_i$, which may, additionally or alternatively, be reported with a differential encoding value such as difference in dB between each beam and the maximum measured value. The measurement results may further comprise a beam identifier. Through the beam identifier a corresponding DFT coefficient $l_i$ may be determined by the access node 420. The determination may be done for example by obtaining a mapping between the sweeping pattern and the DFT codebook coefficients.

The measurement results may further comprise a value indicating an RSRP measurement uncertainty, e.g., in the form of a variance $\sigma_i^2$, which may be calculated by the terminal device 430 as a function of the received SNR and a number of resource elements, REs, over which the RSRP is averaged. The measurement results may yet further comprise Rx beamforming gain and signal-to-noise ratio measured on the received PRS.

Once the terminal device 430 has determined the measure results, the terminal device transmits 435 the measurement results to the access node 420. The access node 420 then processes the measurement results received from the terminal device 430 and determines the AoD $\theta_{LOS}$, which may be an estimate, for the terminal device 430. The access node 420 then transmits 422 the determined AoD to the LMF 410. In some exemplary embodiment the LMF collects and processes determined AoDs from multiple access nodes and thereby estimates a position of a terminal device. The position may be estimated for example by triangulation procedures or by hybrid angle/time-based procedures.

Once the access node 420 receives the measurement results, it may determine the AoD $\theta_{LOS}$ for the terminal device 430 using various methods. For example, for each beam $i \in \{1, \ldots, N_b\}$, a non-linear equation $f_i(\theta_{LOS})=0$ is defined, where $$f_i(\theta_{LOS}) = \frac{\sin^2\left(N_t\pi\left(\frac{d}{\lambda}\cos\theta_{LOS} - \frac{l_i}{O_t N_t}\right)\right)}{\sin^2\left(\pi\left(\frac{d}{\lambda}\cos\theta_{LOS} - \frac{l_i}{O_t N_t}\right)\right)} - \frac{r_i}{K}.$$

In this equation, equation 1, which in this exemplary embodiment is a cost function and not necessarily the solution itself, d is the antenna array spacing, $\lambda$ is the signal wavelength, $l_i$ is the DFT coefficient of beam i, $r_i$ is the RSRP measurement for beam i, $N_t$ is the number of transmit antennas, $O_t$ is the oversampling factor used for beam generation, and K is a power normalization constant that includes Rx beamforming gain and signal-to-noise ratio measured on the received PRS.

Next, in this example, a system of equations $\{f_i(\theta_{LOS})=0\}_{i=1}^{N_b}$ is solved for $\theta_{LOS}$ in the non-linear least squares sense, for example, by using a Gauss-Newton algorithm. Next, in this example, the RSRP measurement variances $\sigma_i^2$ are fed to the Gauss-Newton algorithm and used to compute a weight matrix and the result of the Gauss-Newton algorithm is used as an AoD estimate $\hat{\theta}_{LOS}$.

In another example the AoD $\theta_{LOS}$ for the terminal device 430 may be determined in the following way. $N_b$ RSRP measurements $r_i$ are sorted in decreasing order: in this example, $r'_i$ are the ordered values such that $r'_1 \geq r'_2 \geq \ldots \geq r'_{N_b}$ and $l'_i$ are the corresponding DFT indices. It is to be noted that in some embodiments, RSRP measurements whose measurement uncertainty exceeds a certain threshold (i.e., $\sigma_i^2 > \sigma_{threshold}^2$) may be discarded. Next, in this example, a number $N'_b \leq O_t+1$ of RSRP measurements is selected for interpolation and the AoD is determined using the following equation, equation 2, which is an interpolation function over the $N'_b$ strongest RSRP beams:

$$\hat{\theta}_{LOS} = \frac{\sum_{k=1}^{N'_b} r'_i a\cos\left(\frac{\lambda}{d}\frac{l'_i}{O_t N_t}\right)}{\sum_{k=1}^{N'_b} r'_i}$$

In yet another example the AoD $\theta_{LOS}$ for the terminal device 430 may be determined like in the previous example except that only two largest RSRP values are selected. This may be done irrespective of the oversampling factor $O_t$. This may be beneficial due to lower complexity and/or high measurement RSRP uncertainty, which may no longer guarantee that the $O_t+1$ highest RSRP measurements correspond to the main lobe of the RSRP function. Next in this example the AoD is estimated by the following interpolation function, equation 3, over the two strongest RSRP beams:

$$\hat{\theta}_{LOS} = \frac{r'_1}{r'_1 + r'_2} a\cos\left(\frac{\lambda}{d}\frac{l'_1}{O_t N_t}\right) + \frac{r'_2}{r'_1 + r'_2} a\cos\left(\frac{\lambda}{d}\frac{l'_2}{O_t N_t}\right).$$

Next, another exemplary embodiment is discussed. In this exemplary embodiment an access node, such as a gNB, periodically broadcasts reference signals that may be utilized for positioning, in other words, positioning reference signals PRSs. The access node comprises multiple antennas, and applies beamforming, analog and/or digital, to the PRSs and thereby generates multiple PRS beams directed towards various directions. In this exemplary embodiment, the beamforming is performed using a DFT-based codebook with a uniform linear array such that the beamforming weight for beam l of antenna k is given by $$e^{j2\pi k \frac{l}{O_t N_t}},$$

where $N_t$ is the number of transmit antennas, $O_t$ is an oversampling factor, and k is the antenna index. Thus, the array geometry and the properties of the DFT codebook that the l-th beam points toward an angle $$\theta_l = a\cos\left(\frac{\lambda}{d}\frac{l}{O_tN_t}\right),$$

where d is the antenna array spacing, and λ is the signal wavelength.

In this exemplary embodiment, a terminal device is configured to measure RSRP for the PRS beams transmitted by the access node and received by the terminal device. In the presence of Tx and Rx beamforming, the received PRS signal for Tx beam , when, for the sake of simplicity of explaining, a single layer transmission is assumed, may be defined as equation4:

$$y(l) = w_r^H H w_t(l) s$$

in which $s \in \mathbb{C}$ is the transmitted PRS symbol from a pre-defined sequence, $H \in \mathbb{C}^{N_r \times N_t}$ is the channel matrix ($N_t$ and $N_r$ are respectively the number of transmit and receive antennas), and $w_t(l) \in \mathbb{C}^{N_t \times 1}$, $w_r \in \mathbb{C}^{N_r \times 1}$ are the beamforming vectors applied at transmitter and receiver, respectively. If the Tx utilizes the previously mentioned DFT codebook, it may be determined that $$w_t(l) = \left[1, e^{-j2\pi \frac{l}{O_tN_t}}, \ldots, e^{-j2\pi(N_t-1)\frac{l}{O_tN_t}}\right]^T.$$

Thus, the equation 4, the RSRP for beam l and for a generic channel H may be determined to be equation 5:

$$r(l) = \sigma_{PRS}^2 \mathbb{E} |w_r^H H w_t(l)|^2$$

in which $\sigma_{PRS}^2 = \mathbb{E}|s|^2$ is the power of PRS and $\mathbb{E}$ represents statistical expectation. It is to be noted that the expectation may be approximated by a time and/or frequency average, for example, by averaging the measured RSRP over a number of resource elements RE. For example, in mm-wave communications, a propagation channel may be sparse in angular domain, in other words, it is to be characterized by a relatively small number of rays, which may be concentrated around a line of sight, LOS, direction. Therefore, the channel matrix H may be represented by its angular components, i.e by equation 6:

$$H = \Sigma_{i,j} h_{i,j} a_r(\theta_{ij}) a_t^H(\theta_{ij})$$

in which the summation is performed over propagation clusters i and then over the propagation rays j within cluster i. A ray may be characterized by an angle $\theta_{ij}$ which may have an azimuth and an elevation component, and by a varying amplitude and phase, represented by a complex number $h_{ij}$. $a_r(\theta)$ and $a_t(\theta)$ are steering vectors, respectively for the receiver and the transmitter, depending on the antenna array geometry. For example, for a uniform linear array (ULA), the steering vector is $$a(\theta) = \left[1, e^{-j2\pi\frac{d}{\lambda}\cos\theta}, \ldots, e^{-j2\pi\frac{d}{\lambda}(N-1)\cos\theta}\right]^T$$

where d is the antenna array spacing, λ is the signal wavelength, and N is the number of antennas of the array (i.e., $N_t$ for the transmitter or $N_r$ for the receiver). Thus, equation 7 may be obtained:

$$r(l) = \sigma_{PRS}^2 \Sigma_{i,j} \mathbb{E} |h_{ij}|^2 |w_r^H a_r(\theta_{ij})|^2 |a_t^H(\theta_{ij}) w_t(l)|^2$$

If there is a LOS component and the RSRP is averaged over a number above a threshold, i.e. sufficient, of REs, the RSRP expression may be dominated by the LOS component and therefore can be approximated using equation 8:

$$r(l) \approx r_{LOS}(l) = \sigma_{PRS}^2 \mathbb{E} |h_{LOS}|^2 |w_r^H a_r(\theta_{LOS})|^2 |a_t^H(\theta_{LOS}) w_t(l)|^2$$

It is to be noted that if the interest is in the relative RSRP measurements across beams, the terms that do not depend on l may be ignored and be expressed as a constant K as is in equation 9:

$$r_{LOS}(l) = K |a_t^H(\theta_{LOS}) w_t(l)|^2$$

It is also to be noted that the Rx beamforming term $w_r^H$ may be assumed as a constant because the receiver does not perform beam sweeping. Next, by combining the expressions of the ULA steering vector with $a_t(\theta_{LOS})$ and with the DFT beamforming for $w_t(l)$, equation 10 may be obtained:

$$r_{LOS}(l) = K \left| \sum_{k=0}^{N_t-1} e^{j2\pi k \left(\frac{d}{\lambda}\cos\theta_{LOS} - \frac{l}{O_tN_t}\right)} \right|^2$$

From the equation 10, equation 11 may be obtained:

$$r_{LOS}(l) = K \frac{\sin^2\left(N_t\pi\left(\frac{d}{\lambda}\cos\theta_{LOS} - \frac{l}{O_tN_t}\right)\right)}{\sin^2\left(\pi\left(\frac{d}{\lambda}\cos\theta_{LOS} - \frac{l}{O_tN_t}\right)\right)}$$

Therefore, determination of an AoD may be formulated in a following manner. If the terminal device receives $N_b$ PRS beams with DFT coefficients $\{l_1, \ldots l_{N_b}\}$, the terminal device measures $N_b$ RSRP values $\{r(l_1), \ldots r(l_{N_b})\}$. As shown in the above derivation, under some conditions, the RSRP values may be expressed as $\{r(l_1), \ldots, r(l_{N_b})\} \approx \{r_{LOS}(l_1), \ldots r_{LOS}(l_{N_b})\}$ in which the function $r_{LOS}(l_i)$ may be given by the equation 11. Thus, the available RSRP measurements may be understood as $N_b$ samples of $r_{LOS}(l, \theta_{LOS})$, at known points $l \in \{l_1, \ldots, l_{N_b}\}$, where the only unknown is $\theta_{LOS}$, i.e., the AoD to be determined.

In some exemplary embodiments, the AoD may be determined in a non- linear least squares sense, by using the Gauss-Newton procedure. For example, a system of equations $\{f_i(\theta_{LOS}) = 0\}_{i=1}^{N_b}$ may be defined from the RSRP measurements, where for each beam $i \in \{1, \ldots, N_b\}$, a non-linear equation $f_i(\theta_{LOS}) = 0$ is defined, with $$f_i(\theta_{LOS}) = \frac{\sin^2\left(N\pi\left(\frac{d}{\lambda}\cos\theta_{LOS} - \frac{l_i}{O_tN_t}\right)\right)}{\sin^2\left(\pi\left(\frac{d}{\lambda}\cos\theta_{LOS} - \frac{l_i}{O_tN_t}\right)\right)} - \frac{r_i}{K}.$$

It is to be noted that K is a power normalization constant that includes Rx beamforming gain and signal-to-noise ratio measured on the received PRS. The RSRP measurement variances $\sigma_i^2$ are fed to the Gauss-Newton algorithm and used to compute the weight matrix.

In some other exemplary embodiments, $\theta_{LOS}$ is estimated by a weighted average of the angles corresponding to the strongest beams. For example, the RSRP may first be sorted in decreasing order: let $r'_i$ be the ordered values (such that $r'_1 \geq r'_2 \geq \ldots \geq r'_{N_b}$) and let $l'_i$ the corresponding DFT indices. Next, DFT coefficients may be converted to angles:

$$\theta'_i = a\cos\left(\frac{\lambda}{d}\frac{l'_i}{O_t N_t}\right).$$

The number of selected strongest beams may be denoted as $N'_b$. It may be beneficial to choose such number so as to comprise points in the main lobe of the hypothetical RSRP curve as a function of the angle. FIG. 5 illustrates that the number of RSRP points in the main lobe depends on the oversampling factor. Also, at least $O_t+1$ RSRP points are in the main lobe. As such, it may be chosen that $N'_b \leq O_t+1$. Angles may be weighted by linear coefficients depending on their measured RSRP:

$$\frac{r'_i}{\sum_{i=1}^{N'_b} r'_i}.$$

Additionally, some RSRP measurements may be discarded irrespective of their value if their uncertainty exceeds a predefined threshold, i.e, if $\sigma_i^2 > \sigma_{threshold}^2$. Thus, AoD may be determined as $$\hat{\theta}_{LOS} = \frac{\sum_{i=1}^{N'_b} r'_i a\cos\left(\frac{\lambda}{d}\frac{l'_i}{O_t N_t}\right)}{\sum_{i=1}^{N'_b} r'_i}.$$

Alternatively, only the two strongest beams are combined. In this case, the AoD may be determined as $$\hat{\theta}_{LOS} = \frac{r'_1}{r'_1+r'_2} a\cos\left(\frac{\lambda}{d}\frac{l'_1}{O_t N_t}\right) + \frac{r'_2}{r'_1+r'_2} a\cos\left(\frac{\lambda}{d}\frac{l'_2}{O_t N_t}\right).$$

Figure 5A:
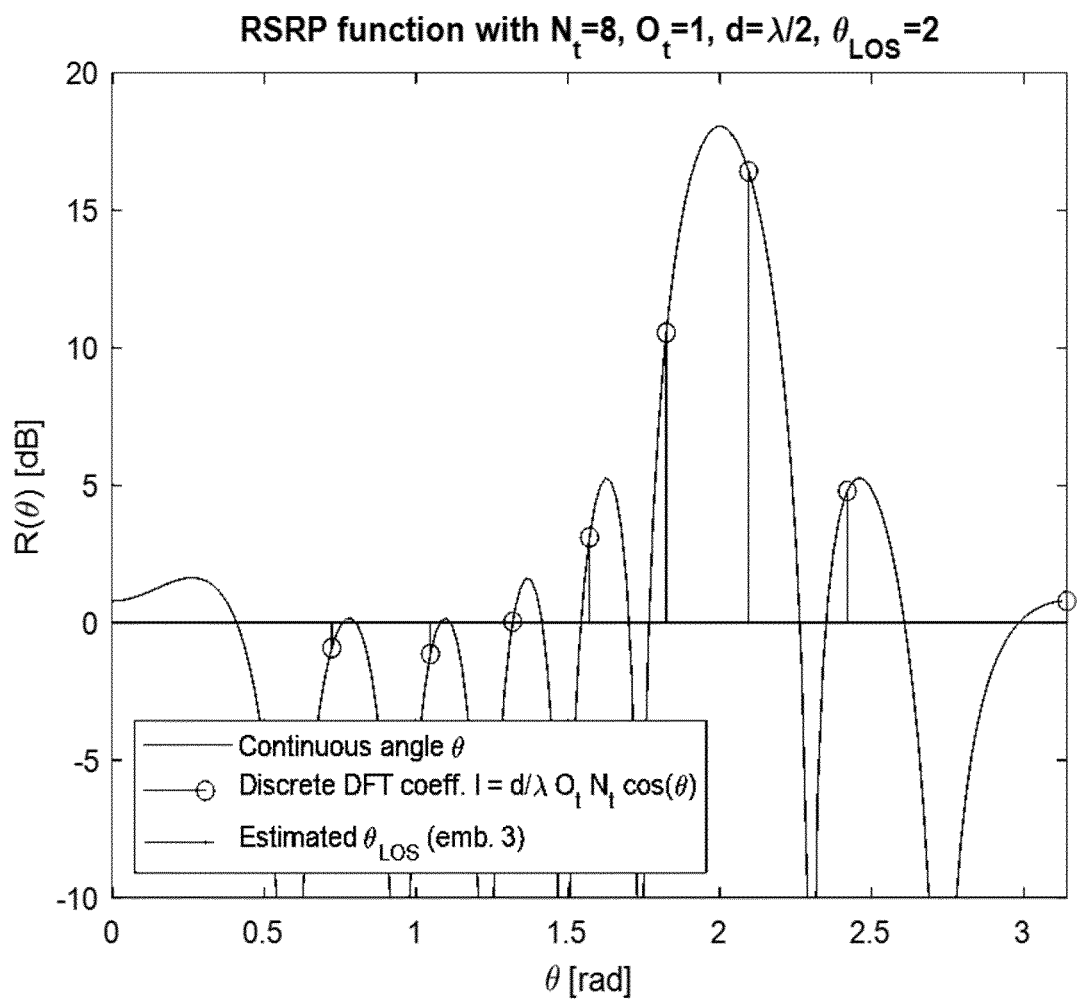
FIGS. 5a-5c illustrate measurement results of exemplary embodiments.
Figure 5B:
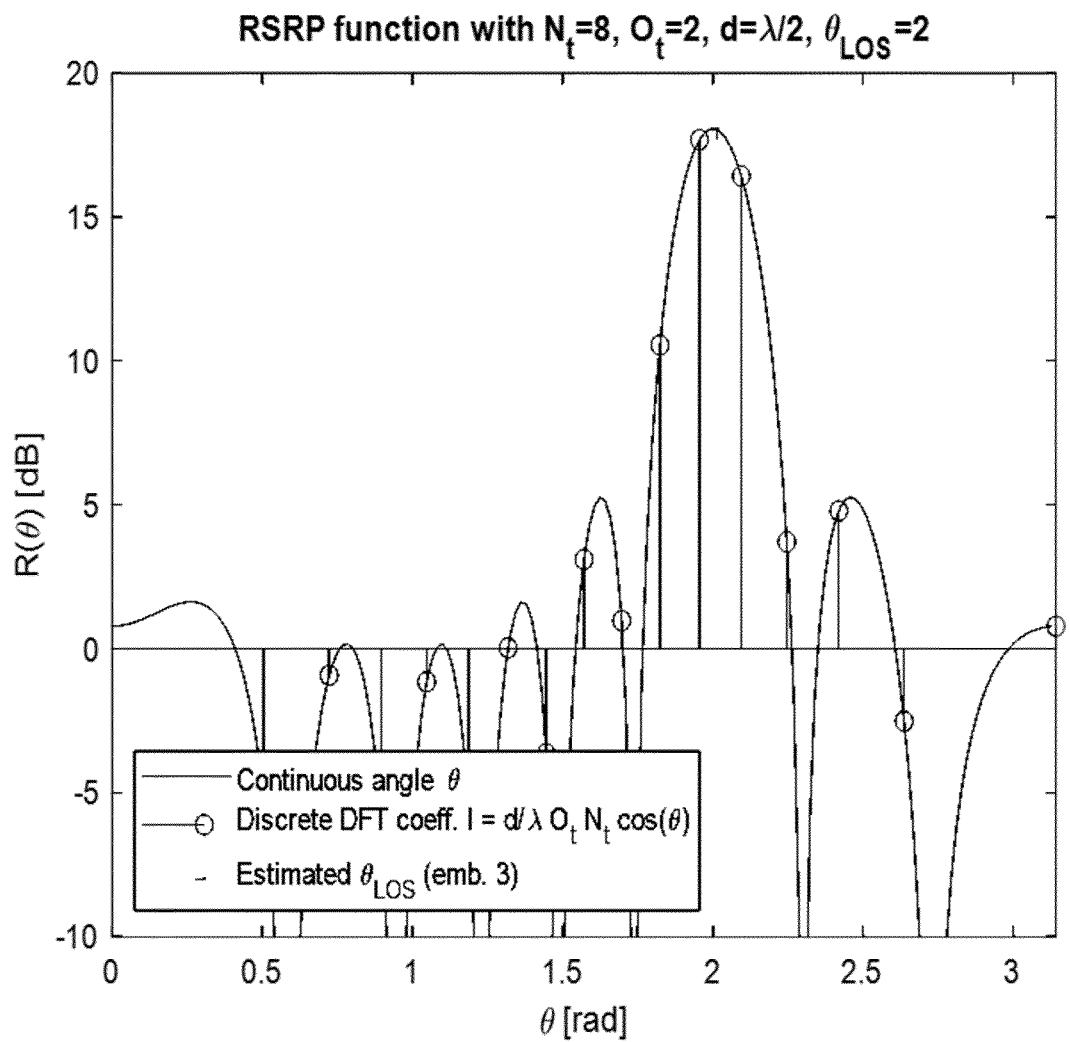
Figure 5C:
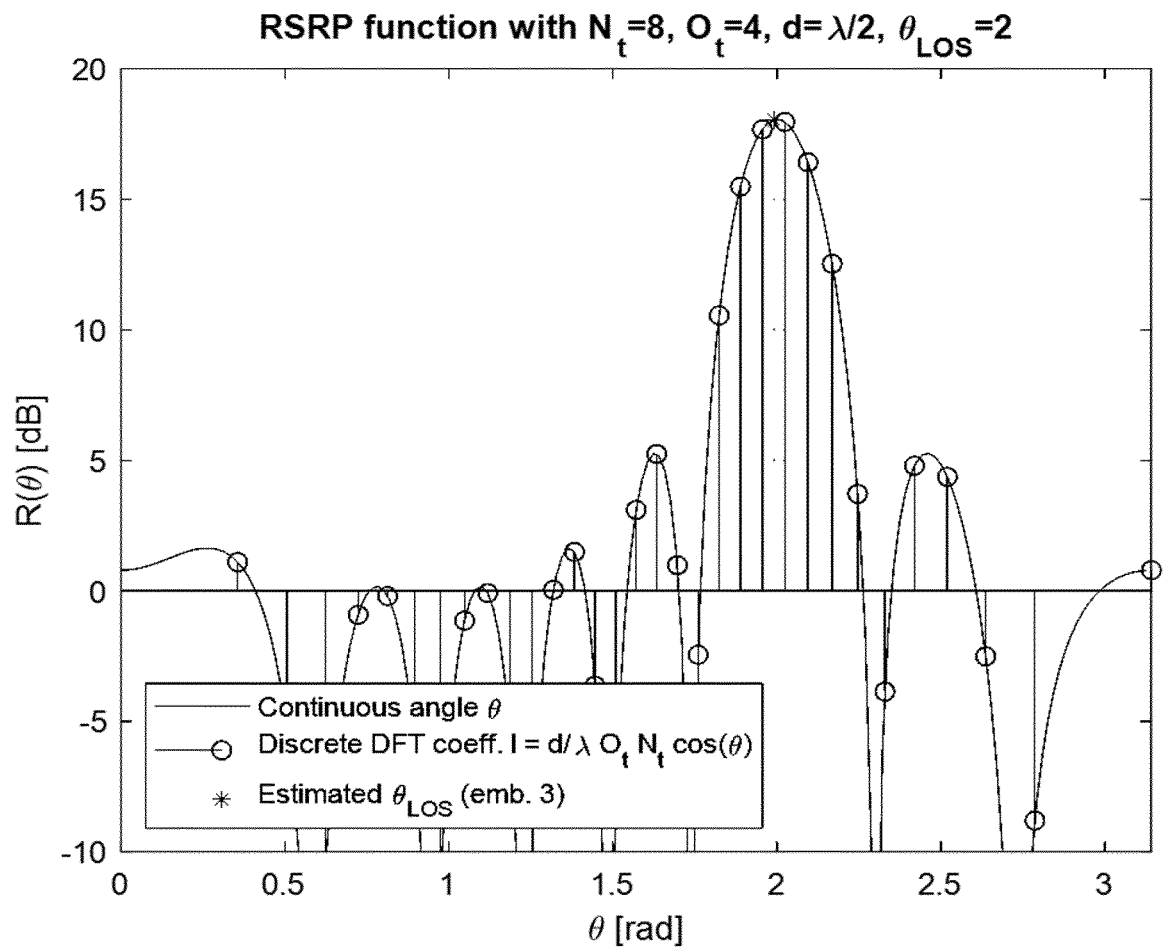

Results of this approach in determining an AoD are illustrated in FIGS. 5a-5c. In these figures, RRSP function vs. θ, RSRP measurements based on DFT beams with different oversampling factors ($O_t \in \{1, 2, 4\}$), and an example of $\theta_{LOS}$ estimate are illustrated.

It is to be noted that the exemplary embodiment described above are described in a downlink scenario, but if a terminal device comprises multiple antennas for transmitting beamformed reference signals, the exemplary embodiments may be applicable in an uplink or sidelink scenario as well.

Figure 6:
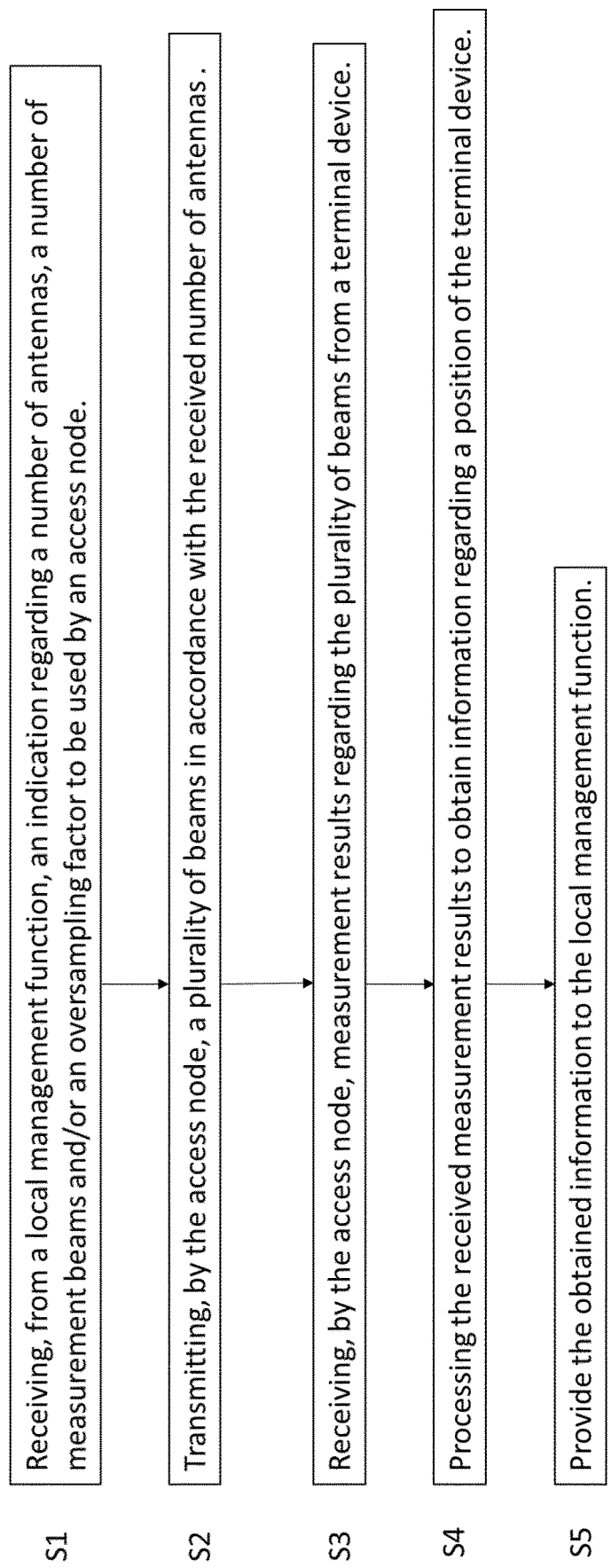
FIGS. 6 and 7 illustrate flow charts of exemplary embodiments.

FIG. 6 illustrates a flow chart according to an exemplary embodiment. In S1, a number of antennas, a number of measurement beams and/or an oversampling factor to be used by an access node are received, from a local management function. In S2, a plurality of beams in accordance with the received number of antennas are transmitted by the access node. In this exemplary embodiment, the plurality of beams may be considered as TX beams as the beamforming takes place in downlink. In S3, measurement results regarding the plurality of beams are received by the access node from a terminal device. In S4, the received measurement results are processed to obtain information regarding a position of the terminal device. In S5 the obtained information is provided to the local management function. This flow chart may be performed, in some exemplary embodiments, by an access node such as gNodeB.

Figure 7:
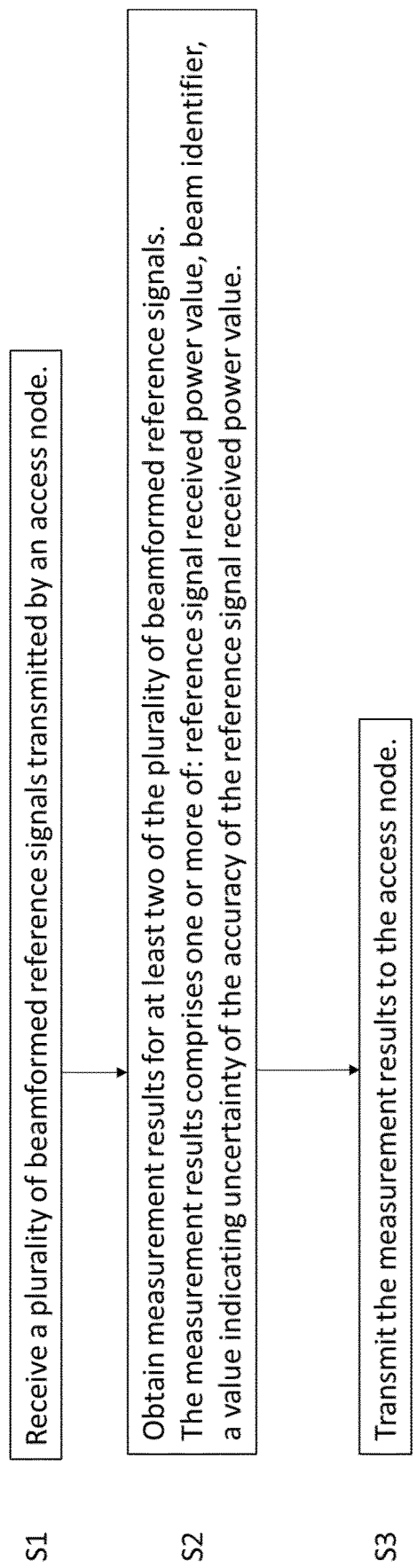

FIG. 7 illustrates another flow chart according to an exemplary embodiment. In S1, a plurality of beamformed reference signals transmitted by an access node are received. In S2, measurement results are obtained for at least two of the plurality of beamformed reference signals. Obtaining measurement results may comprise determining the measurement results. The measurement results comprise one or more of: reference signal received power value, beam identifier, a value indicating uncertainty of the accuracy of the reference signal received power value. In S3 the measurement results are transmitted to the access node. This flow chart may be performed, in some exemplary embodiments, by a terminal device.

Figure 8:
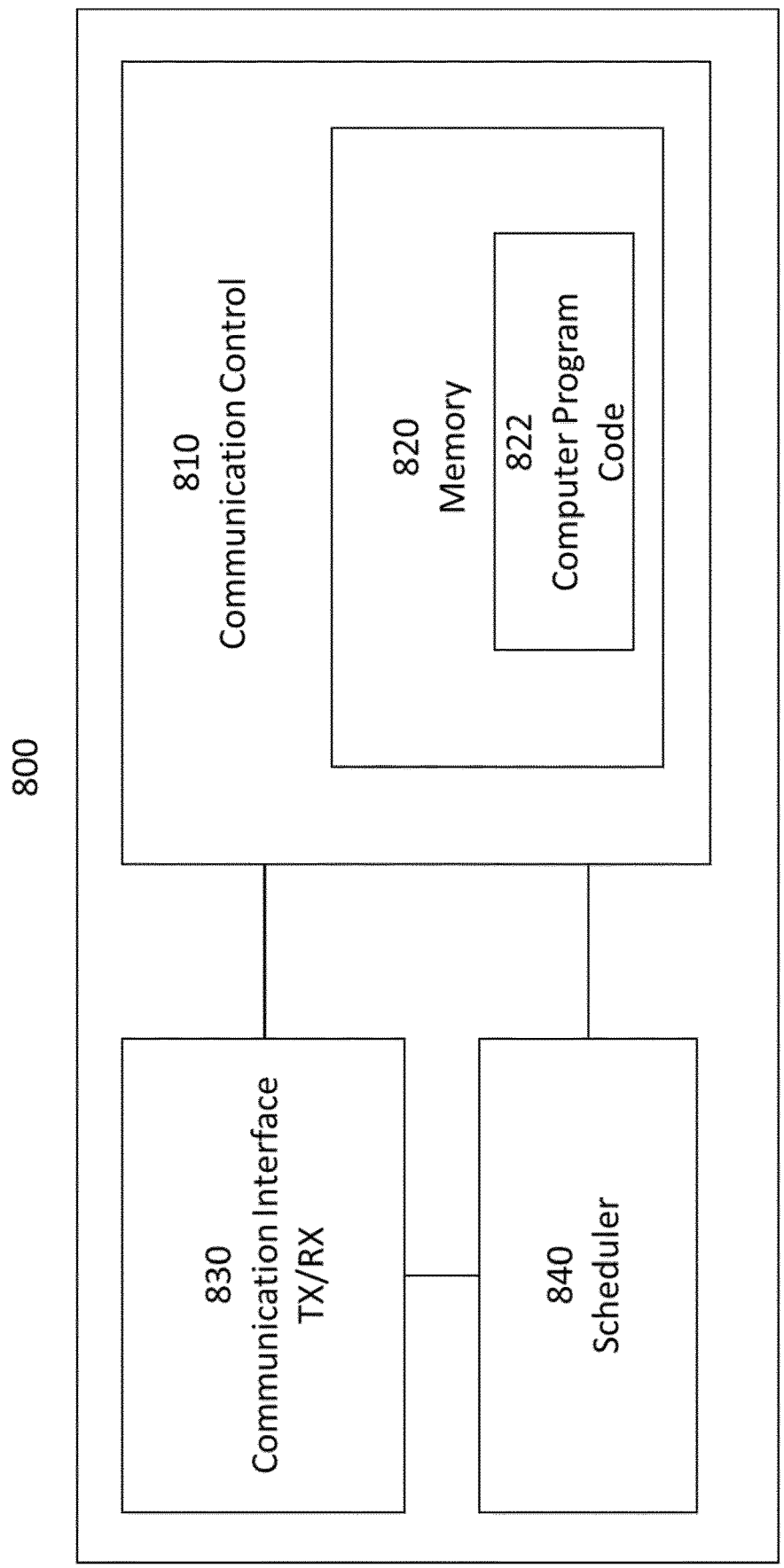
FIG. 8 illustrates an exemplary embodiment of an apparatus.

The apparatus 800 of FIG. 8 illustrates an example embodiment of an apparatus that may be an access node or be comprised in an access node. The apparatus may be, for example, a circuitry or a chipset applicable to an access node to realize the described embodiments. The apparatus (800) may be an electronic device comprising one or more electronic circuitries. The apparatus (800) may comprise a communication control circuitry (810) such as at least one processor, and at least one memory (820) including a computer program code (software) (822) wherein the at least one memory and the computer program code (software) (822) are configured, with the at least one processor, to cause the apparatus (800) to carry out any one of the example embodiments of the access node described above.

The memory (820) may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus (800) may further comprise a communication interface (830) comprising hardware and/or software for realizing communication connectivity according to one or more communication protocols. The communication interface (830) may provide the apparatus with radio communication capabilities to communicate in the cellular communication system. The communication interface may, for example, provide a radio interface to terminal devices. The apparatus (800) may further comprise another interface towards a core network such as the network coordinator apparatus and/or to the access nodes of the cellular communication system. The apparatus (800) may further comprise a scheduler (840) that is configured to allocate resources.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above- described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro- controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2-6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
at least one processor, and
at least one memory including a computer program code, wherein the at least one memory and the computer program code are configured, with the at least one processor, to cause the apparatus to:
receive, from a location management function, information regarding a number of antennas and/or an oversampling factor;
transmit, by the apparatus, a plurality of beams in accordance with the information received regarding the number of antennas and the oversampling factor;
receive measurement results regarding the plurality of beams from another apparatus, wherein the measurement results include: a reference signal received power value (RSRP), a beam identifier, a value indicating uncertainty of an accuracy of the reference signal received power value, a beamforming gain, and a signal-to-noise ratio measured on a positioning reference signal received by the other apparatus, wherein in the RSRP is in the form of a variance $\sigma i^2$, which is calculated by a terminal device as a function of a received SNR and a number of resource elements (RE) over which the RSRP is averaged;
process the received measurement results to obtain information regarding a position of the other apparatus using a Gauss-Newton procedure;
determine an angle of departure (AoD) based on the processed measurement results; and
provide the obtained information regarding the position of the other apparatus and the AoD to the location management function,
wherein the apparatus is or is comprised in the access node or a gNodeB.

* * * * *